July 9, 1968

F. F. HOLUB 3,392,045

EPOXIDIZED POLYOLEFIN-ETHYLENE POLYMER COMPOSITIONS
AND LAMINATES THEREFROM

Filed Jan. 17, 1966

Inventor:
Fred F. Holub,
by Joseph T. Cohen
His Attorney.

United States Patent Office 3,392,045
Patented July 9, 1968

3,392,045
EPOXIDIZED POLYOLEFIN-ETHYLENE POLYMER
COMPOSITIONS AND LAMINATES THEREFROM
Fred F. Holub, Scotia, N.Y., assignor to General Electric
Company, a corporation of New York
Filed Jan. 17, 1966, Ser. No. 520,936
17 Claims. (Cl. 117—93.31)

ABSTRACT OF THE DISCLOSURE

Epoxidized polyolefins combined with an ethylene polymer are cured to give improved products useful as molded objects and for making laminates, or used as adhesives for metallic substrates.

---

This invention relates to novel polymeric compositions and to products using the same. More particularly, the invention is concerned with a composition of matter useful for coating and adhesive purposes comprising a polymer of ethylene, an epoxidized polyolefin and an organic peroxide curing agent for the ethylene polymer. The invention also includes articles of manufacture employing the aforesaid compositions of matter.

Many attempts have been made in the past to adhere polymers of ethylene, particularly polyethylene, to various metal surfaces, particularly aluminum. The desirability of using polyethylene as a coating (for protective or decorative purposes) or as a laminate on a metal substrate is motivated by the fact that polyethylene (and other polymers of ethylene) is relatively chemically inert, and thus is potentially useful in applications where protection from corrosive attack is desired. Furthermore, polyethylene has good dielectric properties and therefore is useful as insulation in various electrical applications. Also, if the hardness and adhesion of polyethylene to substrates, particularly aluminum could be improved, such combination relatively inexpensive structures would find extensive use in the decorative field.

It is well known that polyethylene adheres very poorly, if at all, to non-porous surfaces; in fact its adhesion to metals is so poor that it has often been used as a release agent or a parting agent. In particular, the adhesion of polyethylene to aluminum surfaces is so poor as to make joining of fabricated polyethylene directly to such a metal quite difficult. The valuable properties of polyethylene make its use in conjunction with aluminum substrates desirable, but heretofore such uses have been limited by the difficulty of obtaining strong bonds between polyethylene or other polymers of ethylene in direct contact with such substrates.

Attempts have been made in the past to obtain such strong bonds by heating the polyethylene in contact with metal, e.g., aluminum surfaces for extended periods of time. However, this often causes thermal degradation of the polyethylene with subsequent loss of some of its valuable properties, particularly its strength characteristics.

Other attempts to effect adhesion of polyethylene to metals, generally involved priming or pretreating the substrate prior to applying the polyethylene and thereafter causing the polyethylene to fuse and adhere to the surface by the application of quite high temperatures usually of the order of 200° C. and often higher. In addition to requiring the extra complex step of priming and pre-treating the metal to which the polyethylene was to be adhered, some difficulty has been encountered when high viscosity, low melt index polyethylene was employed because such polyethylenes are generally too viscous even at the elevated temperatures which are used to apply the polyethylene to flow freely over the surface of the metal within a reasonable length of time. Excessive pressure must usually be applied to cause the material to cover the substrate completely and intimately. Although it would be desirable to use high melt index, such materials are generally unsuitable for such coatings because they tend to flow off the surface at the temperatures of 200° C. and higher required to form a secure bond. For this reason the use of polyethylene in coating metals, particularly aluminum or in making laminates therefrom has not enjoyed the volume of usage which the properties of polyethylene would recommend.

In the copending application of Kenneth M. Kiser and myself Ser. No. 520,937, filed concurrently herewith and assigned to the same assignee as the present invention, there is disclosed and claimed a method for directly bonding (without priming) a polymer of ethylene, for instance, polyethylene, to metal substrates by incorporating an organic peroxide, and heat-treating the polymer of ethylene at temperatures and pressures sufficient to effect curing of the polyethylene. Although this produces a strong, adherent bond between the polymer directly in contact with the substrate without the necessity of priming the substrate (as has been necessary in the past) and although joints having high shear strengths are obtained, nevertheless in certain applications where aluminum is the metal substrate, the peel strengths of these bonds is not as great as is desired, particularly where thin metallic sheets or foils of aluminum are to be adhered to a polymer of ethylene.

Accordingly, it is an object of this invention to provide a polymeric composition capable of adhering tenaciously in the cured state to an aluminum surface.

It is another object of the present invention to provide laminates of a polymer of ethylene directly and tightly bonded to an aluminum surface without the need for prior priming of the aluminum.

It is a further object of the invention to provide a process for securely heat-laminating a polymer of ethylene directly to an aluminum surface without causing significant degradation of the strength of the ethylene polymer.

A still further object of the invention is to provide a process for readily joining polyethylene directly to an aluminum surface.

Another object of the invention is to improve the peel strength of a polymer of ethylene bonded directly to aluminum.

Other objects of the invention will become more apparent from the discussion which is found below.

The term "epoxidized polyolefins" or "epoxidized polymer of a conjugated diene" employed in the description of the invention and in the appended claims is intended to include epoxidized homopolymers of conjugated dienes as well as copolymers of conjugated dienes in admixture with each other and/or with lesser amounts of one or more compounds containing an active $CH_2=CH<$ grouping which are copolymerizable therewith. The polymers used in preparing the epoxidized polymers of this invention are prepared by the polymerization of conjugated dienes or mixtures thereof containing from 4 to 8 carbon atoms, such as isoprene, 2-methyl-1,3-butadiene, piperylene (1,3-pentadiene), 2,3-dimethyl-1,3-butadiene, 1,3-hexadiene, 2,4-hexadiene, 2,4-heptadiene, and 2,4-dimethyl-1,3-hexadiene, and copolymers prepared by the copolymerization of the aforementioned conjugated dienes in admixture with lesser amounts of one or more of a copolymerizable compound containing an active $CH_2=C<$ group. Examples of these latter compounds include styrene, acrylonitrile, methacrylonitrile, methylacrylate, methyl methacrylate, vinyl acetate, vinyl chloride, 2-methyl-5-vinylpyridine, 2-vinylpyridine, 4-vinylpyridine, etc. It is preferred to employ expoxidized liquid polybutadiene in the novel composition of this invention. Both epoxidized liquid and solid polymers and copolymers of conjugated dienes are, in general, applicable to the instant invention.

The polymeric starting materials used in preparing the epoxidized polymers can be prepared by a mass polymerization process conducted, for example, in such a manner that a liquid polymer is produced by the sodium catalyzed polymerization of 1,3-butadiene, isoprene, or copolymerization of butadiene and styrene, or by emulsion polymerization processes which are well known in the art. Furthermore, the epoxidation of the polymeric starting materials can be accomplished by methods described in the literature. Accordingly, it is not intended to limit the invention to any particular method of obtaining the polymeric materials to be epoxidized or to any particular epoxidation method. However, it has been found that the method for epoxidizing polymers described in U.S. Patent 3,022,322 is especially suitable for the purpose. According to this patent, epoxidized polymer, particularly epoxidized polybutadiene, is prepared by reacting a liquid polymer with an organic peracid.

In a preferred embodiment, the organic peracid is formed in situ by using an ion exchange resin to catalyze the formation of the peracid. More specifically, a nuclear sulfonic cation exchange resin, such as Amberlite resin IR–120 and Dowex 50X, is employed to catalyze the reaction between an organic acid and hydrogen peroxide. The epoxidized polymers contain from about 0.6 to 19 weight percent oxirane oxygen. In the practice of the instant invention, it is preferred to use epoxidized polymers which have at least 1.4 percent oxirane oxygen. Some of the epoxidized polymers are liquid in the temperature range of zero to 100° C., having a viscosity in this temperature range of about 1 to 500,000 centipoises. Certain of the epoxidized polymers are solids, and these solids materials are equally useful in forming the novel compositions of this invention.

Typical of the expoxidized polyolefin is one obtained by epoxidizing polybutadiene under such conditions that a polymer is obtained having a structure typified by the general structure shown below.

I

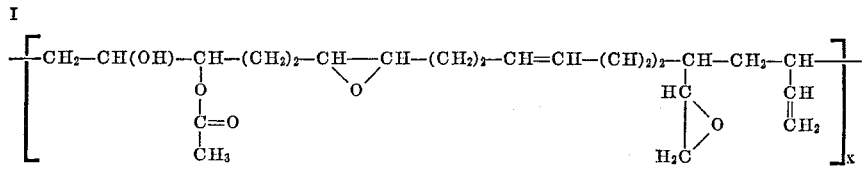

where $x$ is a whole number equal to from 3 to 500 or more. Additional directions for making such epoxidized polyolefins may be found in U.S. Patents 2,826,556; 2,829,131; 2,833,747; 2,829,305; 2,829,135; and 3,092,608. By reference the above patents are incorporated as part of the disclosures and teachings of the present application insofar as they are directed to the method for preparing these epoxidized polyolefins. The molecular weights of such epoxidized polyolefins may range from about from 500 to 250,000 and contain at least 1%, by weight, oxirane oxygen. Their percent epoxy may vary from about 6.0 to about 12 and the epoxy equivalent (i.e. number of grams of resin containing 1 gram mole of epoxide) may be of the order of about 150 to 250 or more.

The amount of epoxidized polymer used with the solid polymer of ethylene can be varied widely. The epoxidized polymers are generally admixed with the ethylene polymer in amounts ranging from 0.1 to 40, and preferably from 0.5 to 10 weight percent, based on the weight of the polymer. The optimum concentration to use in order to provide a polymer composition having a surface which is strongly adherent to aluminum surfaces can be readily determined by routine tests.

A class of peroxides I have found to be exceptionally useful for crosslinking the polymer of ethylene (either with or without additional additives for the purpose) and the epoxidized polybutadiene, especially for effecting improved adhesion of the polymer to aluminum, is one having the general formula

II

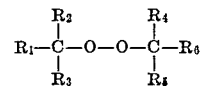

where $R_1$ and $R_6$ are aryl radicals (e.g., phenyl naphthyl, biphenyl, etc.) and $R_2$, $R_3$, $R_4$, and $R_5$ are of the class consisting of hydrogen and alkyl radicals of less than four carbon atoms, e.g., methyl, ethyl, propyl, and isopropyl radicals. The aryl groups may also contain alkyl substituents as in the case of methylphenyl, ethylphenyl, propylphenyl, butylphenyl, dimethylphenyl, etc., and corresponding alkyl derivatives of the other aryl groups mentioned. The term "aryl" as used herein includes alkaryl groups such as tolyl, xylyl, etc. When an alkyl substituent in an aryl group contains less than four carbon atoms, it may be the same as or different from any of $R_2$, $R_3$, $R_4$, or $R_5$. Aryl groups in which the alkyl substituents, if any, contain less than 8 carbon atoms are preferred.

Among the organic peroxides which may be employed in the practice of the present invention, may be mentioned dibenzyl peroxide, bis-($\alpha$-methylbenzyl) peroxide, bis-($\alpha$-propylbenzyl) peroxide, bis - ($\alpha$ - isopropylbenzyl) peroxide, bis-($\alpha,\alpha$-dimethylbenzyl) peroxide, bis-($\alpha,\alpha$-dimethylnaphthylmethyl) peroxide, bis-($\alpha,\alpha$-diethyl-p-ethylbenzyl) peroxide, bis-($\alpha,\alpha$-diisopropyl-p-isopropylbenzyl) peroxide, bis-($\alpha,\alpha$-methyl-$\alpha$-ethyl-p-pentamethylethylbenzyl) peroxide, benzyl-($\alpha$-methylbenzyl) peroxide, benzyl-($\alpha$-methyl-p-isopropylbenzyl) peroxide, benzyl $\alpha,\alpha$-dimethyl-p-methylbenzyl) peroxide, $\alpha$-isopropylbenzyl-($\alpha,\alpha$-diisopropylbenzyl) peroxide.

Other organic cross-linking peroxides (free radical accelerators), in addition to those embraced by the Formula I which may be employed and which remain sufficiently stable until the heat-curing operation takes place include, for instance, tertiary butyl perbenzoate, tertiary butyl hydroperoxide; acetylene peroxides, such as those described in U.S. 2,670,384, issued Feb. 23, 1954; and alkyl peroxides, such as those described in U.S. 2,916,481, issued Dec. 8, 1959.

The amount of organic peroxide employed in the practice of the present invention may be varied widely. Generally, amounts ranging from about 0.1 to about 10–15%, by weight, of the peroxide based on the weight, of the polymer of ethylene can be employed. In general depending upon the type of polymer of ethylene used, the particular epoxidized polyolefin, and the application involved (especially where polyethylene is used as a sandwich between two susbtantially impervious surfaces), the amount of organic peroxide is preferably employed in an amount less than 10%, and usually is in the range of from 0.5 to 5%, by weight. Excessive amounts of peroxide tend to cause evolution of volatile materials which in turn accumulate and tend to exert a breaking stress on the bond.

Fillers may in some cases advantageously promote the adhesion between the ethylene polymer and the aluminum surface without affecting the mechanical properties of the laminate simply by reducing the shrinkage stresses generated when the coated surface is returned to room temperature. Suitable fillers include among others, ground ceramics, finely divided $TiO_2$, fume silica, treated clays, carbon black, calcium carbonate, metal powders, etc. Pigments and dyes of various types may also be included in the polymer formulations. The quantity of filler which may be employed may vary from 1 to 200 parts, by weight, filler per 100 parts of the polymer of ethylene, for example, polyethylene.

The preparation of the polyethylene formulations with the epoxidized polyolefin is relatively simple. Thus, they may be prepared in the usual manner as, for example, by hot milling the ingredients including the organic peroxide on a mill or Banbury mixer. Thereafter, the mixture of ingredients can be placed on a substrate to which the polymer of ethylene is intended to be adhered. If desired, a sandwich material may be prepared by interposing the ethylene polymer formulation between two substrates and thereafter applying heat and pressure to the sandwich-type structure to effect curing and strong adhesion of the polymer to the substrate.

No elaborate pre-treatment of the substrate is required other than to insure that the surface of the substrate is clean. Therefore, for instance, when a metal surface such as aluminum is coated, minimum preparation such as polishing with steel wool, sand-blasting, degreasing with acetone and washing with water may be desirable. Still further increases in bond strength may be accomplished, however, by using some of the standard metal surface preparation techniques as, for instance, hydrochloric acid etching, sodium dichromate or sulfuric acid etching, all in turn followed by adequate washing. Prior degreasing of the surface with a solvent such as the aforesaid acetone or trichloroethylene is the usual practice.

The laminates encompassed by this invention may take many shapes and configurations. Thus, they may consist of a single coating of polyethylene (or polymer of ethylene) on an aluminum substrate, or they may comprise sandwich type structures in which the polyethylene may comprise the inner core between two metal layers at least one of which is aluminum; or conversely the polyethylene may comprise outer surfaces of a sandwich having an inner core of aluminum. In addition, lay-ups of multiple layers of polyethylene and other laminar material may be formed. Specific examples of such laminates include aluminum-polyethylene-steel, aluminum-polyethylene-copper, polyethylene-aluminum, with varying numbers of layers of each; aluminum-polyethylene-aluminum, aluminum-copolymer of propylene and ethylene, aluminum-copolymer of ethylene and isobutylene, etc. In addition, structures in which the polyethylene formulations of this invention can be employed include those obtained by applying the formulations to other plastics, wood, fibreboard, ceramics, glass, etc. The laminates of this invention can be formed in various shapes or shaped after formation by techniques now well known.

In the attached drawing, certain embodiments are shown of different kinds of laminated products possible by means of my invention. Thus FIG. 1 shows a single laminate composed of an aluminum substrate 1, and a cured polymeric composition 2, firmly adhered thereto comprising the heat-cured mixture of ingredients comprising a polymer of ethylene, for example, polyethylene, an epoxidized polyolefin, and an organic peroxide.

Figure 1:
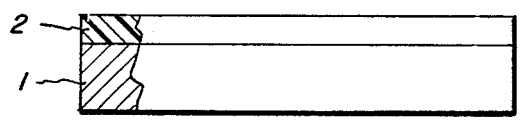
Figure 2:
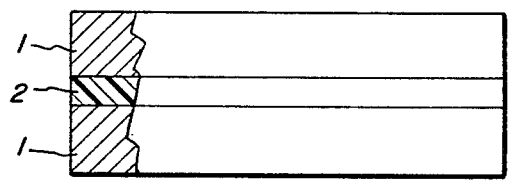
FIG. 2 shows a sandwich-type laminate composed of substrates 1 and an intermediate adherent polymeric composition 2 similar to that shown in FIG. 1.
Figure 3:
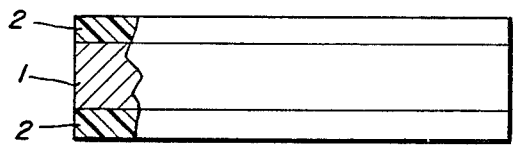
FIG. 3 shows a still further embodiment where the polymeric composition 2 of FIG. 1 is adhered on both sides of an aluminum substrate 1.

The method for forming the laminates embraced by the present invention requires certain conditions of temperature and pressure to effect the desired cross-linking of the polymers of ethylene. Generally, we have found that temperatures in the neighborhood of 125 to 175° C. are optimum to effect curing of the mixture of the ethylene polymer and the epoxidized polyolefin and adhesion to the substrates. The pressures which may be employed may vary widely depending on the peroxide used, the polymers of ethylene employed (molecular weight or melt index), the application involved, the type of aluminum substrates (which will vary and thereby have different resistances to elevated temperatures at which cross-linking may be desired), etc. We have found that pressures ranging from 10 to 1000 p.s.i. at the aforesaid temperatures carried out for times ranging from about 5 minutes to 5 hours or more may advantageously be used.

It will be recognized that the proportions of the polymer of ethylene and the epoxidized polyolefin may be varied widely. Generally, improvements in adhesion of, for instance, polyethylene, to aluminum, are obtained by the incorporation of as little as one part of the epoxidized polyolefin per 100 parts of polyethylene. Generally, we prefer to use from about 1 to about 50 parts of the epoxidized polyolefin per 100 parts of the polymer of ethylene.

In order that those skilled in the art may better understand how the present invention may be practiced, the following examples are given by way of illustration and not by way of limitation. All parts are by weight unless otherwise stated.

In the following test, the peel strength to determine the bond between aluminum and polyethylene, which was the example of the polymer of ethylene employed, was determined as follows. Aluminum sheet material was treated to remove foreign matter thereon by blasting the surface with sand grit, removing any grease with an acetone wash, washing with water to remove the excess grit, and drying the surface of the aluminum. A laminate was prepared by interposing polyethylene between two sheets of the cleaned aluminum placing the assembly in a press which had present ¼ inch spacers in order to prepare a panel of aluminum-polyethylene-aluminum of about ¼ inch thickness. The laminate was pressed at about 155–160° C. for 30 minutes at approximately 1000 p.s.i. The actual peel strengths were measured by cutting out one-inch wide strips from the laminate, peeling back (insofar as possible) about 1½ inches of the aluminum on one side of the polyethylene to a point 180° from the remainder of the laminate, inserting a portion of the peeled aluminum and of the remainder of the panel in opposite jaws of an Instron tester, and then observing the strength of the bond expressed as pounds/inch of width after half of the sample had been separated by the tester starting with the initial 1½ inch peel.

The ingredients in the following examples were all milled together at around 120–140° C., employing di-(α-cumyl) peroxide as the curing agent, unless otherwise stated. The epoxidized polyolefin employed was an epoxidized polybutadiene corresponding in general to Formula I. This epoxidized polybutadiene has a specific gravity of 1.01, a viscosity at 25° C. of 1800 cps., a percent epoxy of 9.0, and an epoxy equivalent of 177. A method for making such epoxidized polybutadienes is found described in U.S. Patent 3,092,608.

Polyethylene A (Alathon 10) is a polyethylene resin of about 22,000 molecular weight and having a density of 0.923 at 25° C. It is available from E. I. du Pont de Nemours and Company, Wilmington, Del. Polyethylene B is a polyethylene of high molecular weight having a density 0.96 and is available from Phillips Petroleum Chemical Company. Polyethylene C is a commercially available polyethylene having a molecular weight of about 7000 and a density of 0.908 at 25° C. Polyethylene C is available from Eastman Chemical Products Company, Rochester, N.Y.

Example 1

A number of polyethylenes were made into sandwich laminates in the manner and of the type described above employing the above-identified epoxidized polybutadiene. The following Table I shows the polymer formulations comprising the polyethylene, the epoxidized polybutadiene, and any filler which may have been employed. All of the values for the ingredients are in parts by weight. Table I also shows results of the peel strengths (indicating the bond strength) of the laminates expressed as pounds per inch of width.

samples before and after irradiation. All samples were molded into sheets at 135° C. for 5 minutes to a thickness of 30 mils prior to irradiation.

TABLE II

| | Sample No. | | |
|---|---|---|---|
| | 8 | 9 | 10 |
| Ingredients: | | | |
| Polyethylene A | 100 | | |
| Polyethylene B | | 100 | |
| Polyethylene C | | | 100 |
| Epoxidized polybutadiene | 5 | 5 | 5 |
| Properties: | | | |
| Before Irradiation: | | | |
| Tensile, p.s.i | 1,655 | 2,466 | 956 |
| Percent elongation | 316 | 50 | 25 |
| After Irradiation: | | | |
| Tensile, p.s.i | 2,112 | 4,627 | 1,140 |
| Percent elongation | 260 | 25 | 280 |

TABLE I

| Ingredients | Sample No. | | | | | | |
|---|---|---|---|---|---|---|---|
| | 1 | 2 | 3 | 4 | 5 | 6 | 7 |
| Polyethylene A | 200 | 200 | | 200 | 200 | | |
| Polyethylene B | | | 200 | | | 200 | |
| Polypropylene* | | | | | | | 200 |
| TiO₂ (filler) | 20 | 20 | 20 | 20 | 20 | 20 | 20 |
| Epoxidized polybutadiene | | | | 10 | 10 | 10 | 10 |
| Di-(α-cumyl) peroxide | | 2 | 2 | | 2 | 2 | 2 |
| Peel Strength (pounds/inch of width) | 1 | 3 | 5 | 2 | 26 | 29 | 7 |

*Polypropylene was used in place of polyethylene to make the laminate.

Example 2

In this example, laminates were prepared similarly as those prepared in Example 1, but instead of using aluminum as outer coverings for the core or polyethylene, 4-mil kraft paper was applied on each side of about 20 mils of the mixture of polyethylene, epoxidized polybutadiene and di-(α-cumyl) peroxide. The milling of the ingredients prior to applying the kraft paper was at about 100 to 125° C. and the curing of the laminate was at about 1000 p.s.i. for 30 minutes at 155° C. The formulation comprised 100 parts of polyethylene C, 10 parts of the epoxidized polybutadiene and 5 parts of di-(α-cumyl) peroxide. The laminate thus obtained was tough, and the paper adhered so tenaciously to the polyethylene core that is could not be removed without destroying the integrity of the laminate.

Example 3

This example illustrates the ability to effect curing of polyethylene and an epoxidized polyolefin with an organic peroxide to form strong sheets. More particularly, a mixture of 100 parts of polyethylene C, 100 parts of polyethylene A, 10 parts of the epoxidized polybutadiene, and 5 parts of di-(α-cumyl) peroxide, all described above, were milled and pressed and cured into the form of a sheet similarly as was done in Example 1 but omitting the aluminum outer sheets. This cured polyethylene sheet was found to have a tensile strength of 2232 p.s.i. and the percent elongation of 420.

Example 4

This example illustrates the ability to make strong, cured products by employing high energy radiation instead of organic peroxides to effect crosslinking of the polymer of ethylene with the epoxidized polyolefin. More particularly, different kinds of polyethylene were combined with epoxidized polybutadiene, pressed into the form of a sheet of about 30 mils thick for 5 minutes at 135° C., and thereafter it radiated with 15×10⁶ rep employing high energy electrons derived from a high voltage electron accelerator more particularly described in Lawton and Woodruff Patent U.S. 3,097,960, issued July 16, 1963 and assigned to the same assignee as the present invention. Tensile strengths and percents elongation of the samples were determined before and after radiation. The following Table II shows the formulation employed in each instance as well as the physical properties of the

Example 5

In this example polyethylene C was mixed with the epoxidized polybutadiene and di-(α-cumyl) peroxide and molded into a 30-mil sheet about 155° C. for 30 minutes at 1000 p.s.i. The tensile strengths and percents elongations of the samples were determined, both at room temperature and at 125° C. The low temperature flexibility of the sample at −78° C. was also determined. A control was also pressed from the polyethylene C without the di-(α-cumyl) peroxide and without any epoxidized polybutadiene. The following Table III shows the formulations employed as well as the test results.

TABLE III

| | Sample No. | |
|---|---|---|
| | ¹11 | 12 |
| Ingredients: | | |
| Polyethylene C | 100 | 100 |
| Epoxidized Polybutadiene | | 5 |
| Di-(α-cumyl) peroxide | | 2.5 |
| Properties: | | |
| Room Temperature: | | |
| Tensile, p.s.i | 840 | 1320 |
| Percent elongation | 98 | 213 |
| 125° C. Properties: | | |
| Tensile, p.s.i | Melts | 44 |
| Percent elongation | (²) | 173 |
| Flexibility at −78° C | Cracks | Flexible |

¹ Pressed at 125° C.
² Flows easily.

It will be noted that curing the polyethylene with the epoxidized polybutadiene improved the low temperature flexibility of the polyethylene alone.

Example 6

In this example an aluminum-polyethylene-aluminum laminate was prepared similarly as in Example 1 with the exception that the polyethylene forulation comprised 200 parts polyethylene A, 5 parts epoxidized polybutadiene, and 2 parts tertiary butyl perbenzoate. Milling of the ingredients, interposition of the polyethylene formulation between the aluminum sheets, curing of the latter into a laminate, and testing were the same as was done as in Example 1. It was fund that the peel strength of the aluminum from the polyethylene core was about 25 pounds per inch width. When the epoxidized polybutadiene was omitted from the formulation, it was less than a quarter of the value obtained by the addition of the epoxidized polybutadiene.

Example 7

Polyethylene formulations comprising 200 parts polyethylene A, 10 parts of the epoxidized polybutadiene and 2 parts di-(α-cumyl) peroxide were each used to bond sheets of steel, stainless steel, and copper by forming laminates (metal-polyethylene-metal) thereof in the same manner as described in Example 1. In each case a tough, adherent bond is obtained between the metal sheets employing the cured polyethylene formulation as the adhesive. When the epoxidized polybutadiene is omitted from the polyethylene formulation and the same laminates are prepared, the peel strengths of the laminates are considerably less than those obtained by additionally employing the epoxidized polybutadiene.

Example 8

In this example mixtures of polyethylene C were made with the epoxidized polybutadiene and di-(α-cumyl) peroxide, varying the amount of the epoxidized polybutadiene. Aluminum-polyethylene-aluminum laminates were prepared similarly as in Example 1 and each of the samples was tested for adhesion of the polyethylene to the aluminum substrate. Table IV shows the formulations employed.

TABLE IV

| Ingredients | Sample No. | | | |
|---|---|---|---|---|
| | 13 | 14 | 15 | 16 |
| Polyethylene C | 100 | 100 | 100 | 100 |
| Epoxidized Polybutadiene | 5 | 10 | 15 | 20 |
| TiO$_2$ | 20 | 20 | 20 | 20 |
| Di-(α-cumyl) peroxide | 5 | 5 | 5 | 5 |

In each instance where the epoxidized polybutadiene was included, adhesion of the polyethylene to the aluminum substrate was tenacious and difficulty was encountered in trying to separate the aluminum substrate from the polyethylene core.

It will of course be apparent to those skilled in the art that in addition to the epoxidized polybutadiene employed in the foregoing samples, other epoxidized polyolefins, many examples of which have been given above, may be used without departing from the scope of the invention. Also, it should be recognized that it is intended to include within the scope of the claimed invention, other polymers of ethylene convertible by organic peroxides or by radiation with high energy radiation to the crosslinked, substantially infusible and insoluble state. Among such polymers of ethylene may be mentioned, for instance, copolymers of ethylene and propylene, ethylene and butylene, ethylene and isobutylene, ethylene and methyl methacrylate, ethylene and vinyl acetate, etc.; terpolymers of ethylene, propylene and isobutylene, etc.; where the ethylene in the polymer comprises at least 50%, by weight, of the total weight of the ethylene and the other comonomers before copolymerization. Blends of ethylene polymers are not precluded. The polymers of polyethylene may range in molecular weight from 5000 to 200,000 or more. The various polyethylenes useful herein and methods for preparing the same are found, for example, in U.S. 2,153,533; U.S. 2,825,721; U.S. 3,196,123; and in "Modern Plastics Encyclopedia," New York, N.Y., 1949, pages 268–271; and in an article by Lawton et al. in "Industrial and Engineering Chemistry," 46, pages 1703–1709 (1954). By reference, these patents and articles are incorporated in the instant application.

Obviously the proportions of ingredients such as the polymer of ethylene, the organic peroxide, the epoxidized polyolefins, any fillers that may be employed, other modifying agents, etc., may be varied widely within the scope of the described invention.

Additionally, other peroxides may be employed as well as other doses of irradiation may be used to effect crosslinking of the ethylene polymer formulation. When high energy irradiation is employed, the energy of the electrons employed may range from about 50,000 electron volts to 20,000,000 electron volts or higher, depending upon the depth to which it is desired to irradiate materials undergoing treatment. Dosages ranging from about $1 \times 10^6$ rep to as high as $3 \times 10^7$ rep are advantageously employed, although obviously radiation dosages outside these limits may be employed without departing from the scope of the invention. Each application will recommend the proper radiation dosage required where irradiation is the means used to effect crosslinking of the mixture of the polymer of ethylene and the epoxidized polyolefin.

Bonded and laminated articles of the present invention have many uses. Because of the mechanical and electrical properties of material having polar surfaces such as metal, glass, ceramics, etc., which are eminently useful for electronics industry purposes, polymers of ethylene bonded to such substrates would additionally increase the utility of such substrates for the intended purpose. In addition, the polymer of ethylene securely bonded to a substrate, particularly metal substrates, can be used for corrosion protection as liners for water tanks, tanks which would be expected to hold corrosive chemicals, etc. Additionally, the ability to securely adhere a polymer of ethylene, such as polyethylene, to a substrate particularly aluminum permits metallization of molded, shaped polyethylene objects using temperatures well above the softening point of polyethylene itself, because the polyethylene is not only securely adhered to the substrate, but it is in the infusible, insoluble state thus being able to resist the elevated temperatures required in many instances for metallization. Decorative panels can be prepared by bonding techniques described above employing in addition to aluminum surfaces, substrates such as plywood, laminated plastic substrates, fibreboard, cardboard, paper, etc., and applying the polyethylene-epoxidized polyolefin mixture in relatively thin layers and effecting curing at elevated temperatures and pressures. The polyethylene structures thus obtained have good abrasion resistance and can be readily washed or cleaned with detergents and even a selective number of solvents without any apparent harm. The polyethylene-epoxidized polyolefin composition which is applied to such substrates for decorative purposes can be pigmented or tinted with dyes to effect unusual color variations.

Composite articles advantageously made by adhesion of polymers of ethylene to metals such as aluminum, in accordance with this invention include motor mounts, silent block bushings, automotive sealing devices, steam hose, and various diaphragms, mounts and rolls. Ideally, cans (containers) can be made in which the sides and the ends are composed of paper (such as kraft paper), steel, aluminum, bonded on each side to polyethylene. Insulated conductors can also be made by coating a conducting metal core (e.g., copper, aluminum, etc.) with the mixtures of polymers of ethylene, epoxidized polyolefin and the organic peroxide, and thereafter heat-treating the coated conductor. Films of the aforesaid compositions can also be used in capacitor applications. Printing rolls can also be made from the cured compositions of the present invention.

What I claim as new and desire to secure by Letters Patent of the United States is:

1. A composition of matter comprising (1) a polymer of ethylene, (2) from 0.1 to 40% of an epoxidized polyolefin, and (3) from 0.1 to 10% of an organic peroxide curing agent for the polymer of ethylene, the percents of (2) and (3) being based on the weight of (1).

2. A composition as in claim 1 in which the polymer of ethylene is polyethylene.

3. A composition as in claim 1 in which the epoxidized polyolefin is an epoxidized polybutadiene.

4. A composition of matter comprising (1) polyethylene, (2) from 0.1 to 40% of an epoxidized polybutadiene, and (3) from 0.1 to 10% di-(α-cumyl) peroxide, the percents of (2) and (3) being based on the weight of (1).

5. A composition of matter comprising (1) polyethylene, (2) from 0.1 to 40% of an epoxidized polybutadiene, and (3) from 0.1 to 10% tertiary butyl perbenzoate, the percents of (2) and (3) being based on the weight of (1).

6. A composition of matter as in claim 1 wherein an inorganic filler is incorporated.

7. The heat-treated product of a mixture of ingredients comprising (1) a polymer of ethylene, (2) from 0.1 to 40% of an epoxidized polyolefin, and (3) from 0.1 to 10% of an organic peroxide curing agent for the polymer of ethylene, the percents of (2) and (3) being based on the weight of (1).

8. The heat-treated composition of claim 7 wherein the polymer of ethylene is polyethylene.

9. The heat-treated composition of claim 7 wherein the epoxidized polyolefin is epoxidized polybutadiene.

10. The heat-treated composition of claim 7 wherein the organic peroxide is di-($\alpha$-cumyl) peroxide.

11. A laminate comprising an aluminum substrate and a cured polymeric composition adhered thereto comprising a heat-treated mixture of ingredients comprising (1) a polymer of ethylene, (2) from 0.1 to 40% of an epoxidized polyolefin, and (3) from 0.1 to 10% of an organic peroxide curing agent for the polymer of ethylene the percents of (2) and (3) being based on the weight of (1).

12. An article of manufacture comprising a substrate of aluminum and a cured, adherent polymer composition comprising the heat-treated mixture of ingredients comprising (1) polyethylene, (2) from 0.1 to 40% of an epoxidized polybutadiene, and (3) from 0.1 to 10% of di-($\alpha$-cumyl) peroxide, the percents of (2) and (3) being based on the weight of (1).

13. An article of manufacture as in claim 11 wherein the organic peroxide is tertiary butyl perbenzoate.

14. The process for adhering a polymer of ethylene to an aluminum substrate which comprises (1) incorporating in the polymer of ethylene, 0.1 to 40%, based on the weight of the ethylene polymer of an epoxidized polybutadiene, and thereafter subjecting the mixture of ingredients while in intimate contact with the aluminum substrate to conditions whereby free radical polymerization of the polymer of ethylene is effected by a free radical generating means selected from the class consisting of organic peroxides in an amount equal to 0.1 to 10%, by weight, of the polymer of ethylene and high energy radiation where the electron energy ranges from 50,000 to 20,000,000 electron volts or higher and dosages of from $1 \times 10^6$ rep to $3 \times 10^7$ rep are used.

15. The process as in claim 14 wherein the mixture of the polymer of ethylene and the epoxidized polyolefin contains the specified amount of an organic peroxide as the free radical producing means.

16. The process as in claim 15 wherein the free radical producing means is di-($\alpha$-cumyl) peroxide.

17. A laminate comprising a metal substrate and a cured composition adhered thereto comprising a heat-treated mixture of ingredients comprising (1) a polymer of ethylene, (2) from 0.1 to 40% of an epoxidized polyolefin, and (3) from 0.1 to 10% of an organic peroxide curing agent for the polymer of ethylene, the percents of (2) and (3) being based on the weight of (1).

References Cited
UNITED STATES PATENTS

| | | | |
|---|---|---|---|
| 2,916,481 | 12/1959 | Gilmont | 260—94.9 |
| 3,196,123 | 7/1965 | Wheelock | 260—836 |
| 3,294,864 | 12/1966 | Karoly | 260—836 |

MURRAY TILLMAN, *Primary Examiner.*

P. LIEBERMAN, *Assistant Examiner.*